US 8,015,502 B2

(12) United States Patent
LuVogt et al.

(10) Patent No.: US 8,015,502 B2
(45) Date of Patent: Sep. 6, 2011

(54) DYNAMIC LAYOUT FOR A SEARCH ENGINE RESULTS PAGE ON IMPLICIT USER FEEDBACK

(75) Inventors: Christopher LuVogt, San Francisco, CA (US); Erick Cantu-Paz, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 682 days.

(21) Appl. No.: 11/752,001

(22) Filed: May 22, 2007

(65) Prior Publication Data

US 2008/0295006 A1 Nov. 27, 2008

(51) Int. Cl.
*G06F 3/048* (2006.01)
*G06F 3/00* (2006.01)

(52) U.S. Cl. .......................... 715/788; 715/764; 715/783

(58) Field of Classification Search .................. 715/764, 715/783, 788, 792, 838; 705/10, 14, 26–27, 705/27.1

See application file for complete search history.

(56) References Cited

U.S. PATENT DOCUMENTS

| | | | |
|---|---|---|---|
| 5,982,369 A * | 11/1999 | Sciammarella et al. ....... 715/835 |
| 6,058,417 A * | 5/2000 | Hess et al. ..................... 709/219 |
| 6,271,840 B1 * | 8/2001 | Finseth et al. ................. 715/236 |
| 6,369,840 B1 * | 4/2002 | Barnett et al. ................. 715/853 |
| 6,496,857 B1 * | 12/2002 | Dustin et al. .................. 709/219 |
| 6,732,161 B1 * | 5/2004 | Hess et al. ..................... 709/219 |
| 6,785,670 B1 * | 8/2004 | Chiang et al. ..................... 707/3 |
| 7,013,285 B1 * | 3/2006 | Rebane ............................ 705/10 |
| 7,076,443 B1 * | 7/2006 | Emens et al. ............. 705/14.55 |
| 7,082,409 B1 * | 7/2006 | Cherry ............................ 705/26 |
| 7,451,152 B2 * | 11/2008 | Kraft et al. ..................... 707/10 |
| 7,530,026 B2 * | 5/2009 | Chaudhri et al. ............ 715/764 |
| 2002/0161658 A1 | 10/2002 | Sussman ........................ 705/26 |
| 2004/0002959 A1 * | 1/2004 | Alpert et al. ...................... 707/3 |
| 2005/0010484 A1 * | 1/2005 | Bohannon et al. .............. 705/26 |
| 2005/0065806 A1 * | 3/2005 | Harik ................................ 705/1 |
| 2005/0262428 A1 * | 11/2005 | Little et al. ................. 715/501.1 |
| 2006/0026013 A1 * | 2/2006 | Kraft ................................ 705/1 |
| 2006/0167857 A1 * | 7/2006 | Kraft et al. ........................ 707/3 |
| 2006/0277469 A1 * | 12/2006 | Chaudhri et al. ............ 715/709 |
| 2007/0043766 A1 * | 2/2007 | Nicholas et al. ........... 707/104.1 |
| 2007/0101279 A1 * | 5/2007 | Chaudhri et al. ............ 715/762 |
| 2007/0101291 A1 * | 5/2007 | Forstall et al. ................ 715/805 |
| 2007/0101433 A1 * | 5/2007 | Louch et al. ..................... 726/25 |
| 2007/0118520 A1 * | 5/2007 | Bliss et al. ........................ 707/5 |
| 2007/0130541 A1 * | 6/2007 | Louch et al. .................. 715/804 |
| 2007/0176796 A1 * | 8/2007 | Bliss et al. ............... 340/995.14 |
| 2007/0186007 A1 * | 8/2007 | Field et al. .................... 709/233 |
| 2008/0120325 A1 * | 5/2008 | Davis ............................ 707/102 |
| 2008/0229240 A1 * | 9/2008 | Garbow et al. ............... 715/810 |

* cited by examiner

*Primary Examiner* — Nicholas Augustine
(74) *Attorney, Agent, or Firm* — Seth H. Ostrow; Ostrow Kaufman LLP

(57) ABSTRACT

The present invention is directed towards systems and methods for providing dynamic search results based upon historical data through the use of one or more widgets. The method of the present invention comprises receiving a request for content from a client and generating one or more widgets for providing search result content. A display profile is applied to the one or more widgets and the one or more widgets are combined with static search results to form a search result page that is provided to a requesting client.

20 Claims, 3 Drawing Sheets

DYNAMIC LAYOUT FOR A SEARCH ENGINE RESULTS PAGE ON IMPLICIT USER FEEDBACK

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The invention disclosed herein relates generally to providing search results to a user. More specifically, the present invention is directed to systems and methods for providing search results to a user from a plurality of sources via modular widgets that are responsive to user interaction.

BACKGROUND OF THE INVENTION

Nearly all Internet users interact with search engines on a daily basis for locating the information they desire. Search engines provide a convenient access point to a wealth of information related to nearly every subject imaginable and research has enabled a search engine to locate increasingly relevant results based upon a user query.

Despite the popularity of web search engines, little currently distinguishes user interaction with one engine from another. For example, the search results currently provided by Yahoo! and others are similar in their presentation, thus failing to provide any impetus for switching to or staying with any given search engine. Also, search engines are often described as a "passthrough" experience; that is, a user merely views the search engine as a temporary stop on the path to their desired page. This mentality makes it more difficult to efficiently monetize the services of the search engine, since the user has an incentive to leave the page as quickly as possible.

Additionally, current search engine techniques do not adequately leverage the wide variety of vertical searches and properties currently available. Current user interfaces require users to explicitly indicate that they want results from each vertical individually and many users are unaware that vertical searches exist, or how a given user may be able to utilize such vertical searches.

Currently search engines use a wide variety of sophisticated algorithms to select relevant search results from an index of content items but ignore the valuable information for presentation of search results that the search engine may gather by monitoring how users interact with the search results. This results in a static presentation of data, as opposed to a dynamic display that adjusts to user tendencies and preferences.

SUMMARY OF THE INVENTION

The present invention is directed towards methods and systems for providing dynamic search results based upon historical user interaction with one or more widgets for the display of search results. The method according to one embodiment of the present invention comprises receiving a request for content from a client. In response to the request, one or more widgets are generated for providing search result content. In a preferred embodiment, the generated widget comprises a plurality of dynamic HTML elements. In accordance with one embodiment, the generated widgets may comprise a plurality of control elements, such as open, close, maximize or minimize buttons.

A display profile may be applied to the generated widgets. In one embodiment, the display profile may control whether a particular widget is displayed or hidden when a user initially views a search result page. The display profile may comprise aggregate statistical data regarding user interaction with a plurality of widgets. Alternatively, the display profile may comprise class data regarding interaction with one or more widgets by a class of users or class of queries.

The generated widgets may be combined with search results to form a final search result page, with the search results page provided to the client. In one embodiment, the widgets are combined with the search results such that search results are asynchronously requested after the search result page is provided. Alternative embodiments may exist wherein client information may be recorded upon user interaction with the widget control elements. These data may be stored within a display profile.

The present invention is further directed towards a system for providing dynamic search results based upon historical interaction with one or more widgets that display search results. The system of the present invention comprises a plurality of client devices and a plurality of data servers coupled to a network. The system further comprises at least one content server coupled to the network and operative to receive requests for content from the client devices. The content server comprises a widget generator operative to generate one or more widgets for providing search result content. In one embodiment, the widgets may comprise HTML elements. The widgets may also comprise a plurality of control elements such as open, close, maximize or minimize elements.

The content server may further comprise a page generator operative to combine widgets with search results to form a search result page and an interaction log comprising display profiles corresponding to one or more widgets. In one embodiment, the display profile comprises aggregate statistical data regarding user interaction with the widgets. In an alternative embodiment, the display profile may comprise class data regarding interaction with the plurality of widgets by a class of users. Embodiments of the invention also contemplate the use of individual profiles.

The widget generator within the content server may further be operative to apply the display profiles to one or more widgets. In one embodiment, the display profile may control whether a widget is displayed or hidden. The widgets may further be operative to asynchronously request content after the search result page is provided to the client. Alternative embodiments may exist where client information may be recorded upon user interaction with the widget control elements. These data may be stored within a display profile.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
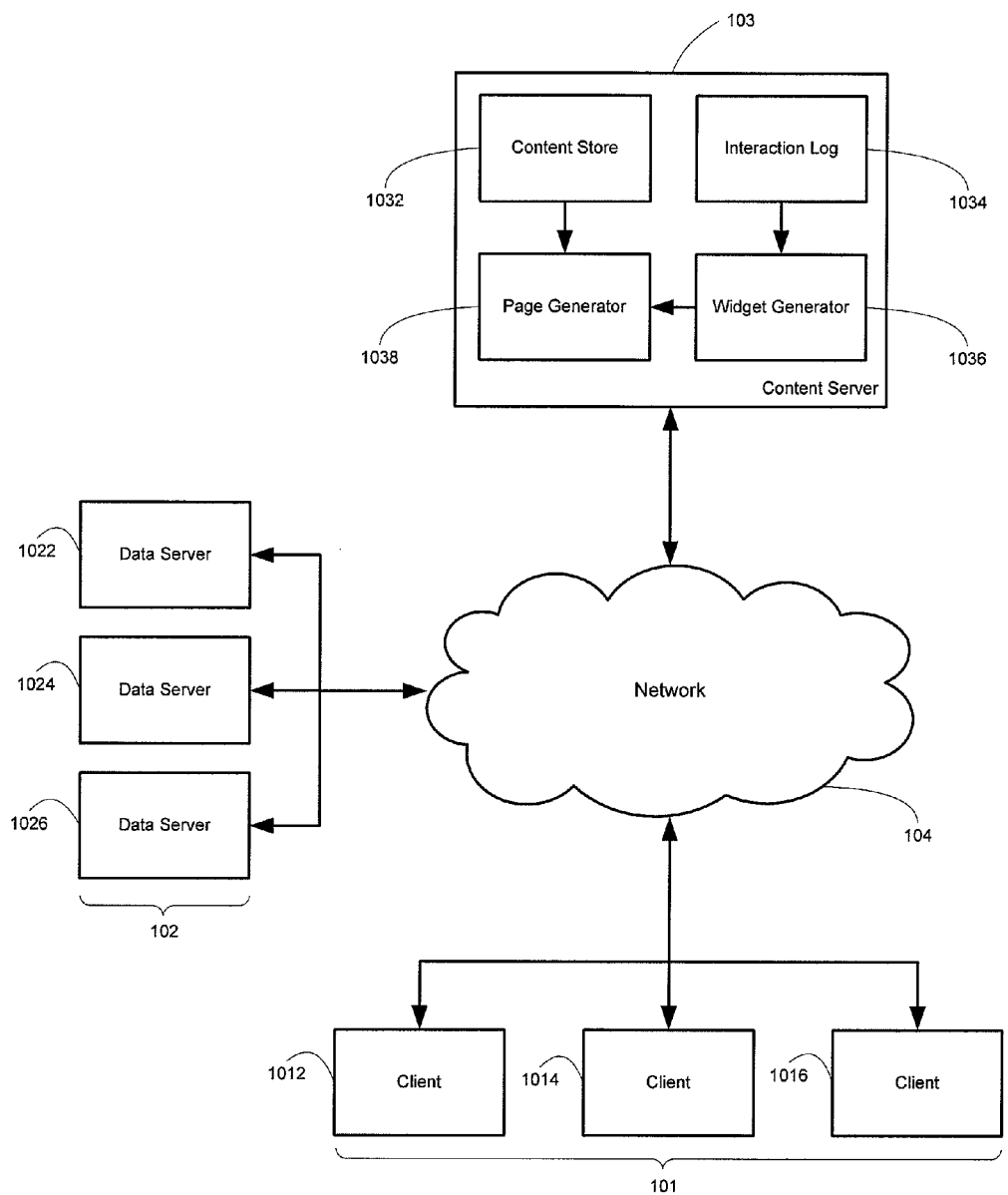
FIG. 1 is a block diagram illustrating a system for providing customizable search results to a user across a network according to one embodiment of the present invention.

FIG. 1 presents a block diagram illustrating one embodiment of a system for providing customizable search results to a user across a network. According to the embodiment illustrated in FIG. 1, a system for providing search results to a user comprises one or more client devices 1012, 1014 and 1016, one or more data servers 1022, 1022 and 1026, one or more networks 104 and one or more content servers 103.

According to the embodiment of FIG. 1, client devices 1012, 1014 and 1016 are communicatively coupled to the network 104, which may include a connection to one or more local and wide area networks, such as the Internet, and may utilize combinations of both wired and wireless media. According to one embodiment of the invention, a client device 1012, 1014 and 1016 is a general purpose personal computer comprising a processor, transient and persistent storage devices operable to execute software such as a web browser, peripheral devices (input/output, CD-ROM, USB, etc.) and a network interface. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

Client devices 1012, 1014 and 1016 are operative to communicate requests to a given content server 103 via the network 104. A given request may be in the form of an HTTP request, RTP request, SOAP request, or any network protocol for requesting content as is known to those of skill in the art. In one embodiment, a client device 1012, 1014 and 1016 may utilize a web browser to request a dynamically built web page comprising search results for one or more requested search terms or phrases, e.g., a search query.

According to one embodiment, the content server 103 comprises a content data store 1032, interaction log 1034, page generator 1038 and widget generator 1036. The content server 103 may be operative to receive requests for search results from clients 1012, 1014 and 1016. A given client 1012, 1014 and 1016 may generate a search request by providing a search query within an HTML text box on an HTML page that the content server 103 may provide to the user.

The content server 103 may be operative to receive the request and generate a page corresponding to the search results. The page that the content server 103 generates may comprise search results for content stored within the content data store 1032 and one or more customized widgets that the widget generator 1036 may provide. The content data store 1032 may comprise a database or other storage mechanism associating search results with user queries as is known to those of skill in the art.

A page generator 1038 fetches the main search results from content data store 1032 and begins building a search result page using the results that the page generator 1038 receives from the content store 1032. The page generator may also retrieve one or more widgets that the widget generator 1036 generates, combining the widgets with the results from the content store 1032. In accordance with one embodiment, the widgets that the widget generator 1036 provides may comprise elements for displaying content, e.g., links to content items that are responsive to the query that the user provides. For example, if the search results are provided in an HTML file to a web browser executing for a client 1012, 1014 and 1016, a widget may comprise a collection of HTML elements (such as DIV elements) to form a modular display element.

According to one embodiment, the widget generator 1036 generates widgets on the basis of information stored within the interaction log 1034. The interaction log 1034 may store information regarding interaction by one or more users with an associated widget that the widget generator 1036 provides. For example, a widget generated by widget generator 1036 may comprises an element for the display of search results from a particular data server 1022, 1024 and 1026. The widget may comprise a plurality of user controls including, but not limited to, minimize/maximize buttons, a close button, a rank slider or the selection of search results from the widget. When a user interacts with any of the controls present on the widget (e.g., minimizing the widget) a message may be sent to the content server 103 indicating the user action. According to one embodiment, this message may be sent asynchronously utilizing AJAX technologies as is known by those of skill in the art.

When the content server 103 receives a message comprising information regarding user interaction, the content server 103 may parse the message through the use of a message parser (not shown) to update statistics that the interaction log 1034 may maintain. For example, if the content server 103 receives a message indicating that a user minimized a widget, a message parser may retrieve the currently stored information regarding the widget and update the information, which the content server 103 may perform on a per user basis. That is, a minimize message may signal that the widget is declining in popularity and thus a parameter defining whether the widget is initially maximized may be adjusted to cause the widget to initially display in a minimized state. More information regarding the display of widgets is described in greater detail herein.

The widget generator 1036 may utilize the information from the interaction log 1034 to control the manner or state in which a given widget is initially displayed on the search results page generated by the page generator 1038. For example, a widget corresponding to one or more search results retrieved from an image server (a server maintaining images that are responsive to the user search query) may be more popular than a widget corresponding to search results retrieved from a news server (a server maintaining news entries that are responsive to the user search query). Popularity may be determined based upon user interactions with a given widget. For example, the image widget may receive more clicks corresponding to the selection of links or more clicks on the maximize control (e.g., bringing the search results into view). Also, the news widget may receive few clicks corresponding to the selection of links or many clicks on the minimize control (e.g., taking the search results out of view). Thus, it may be determined through the stored statistics (which may comprise the use of one or more statistical models) that users prefer to browse pictures of items related to their search results than to read blog entries related to their queries.

Alternative embodiments may exist wherein a plurality of other factors may be utilized in determining the initial display behavior of a widget. For example, the actual user query may be utilized to determine one or more given widgets to display. Continuing the previous example, if a user enters the query "fiscal reform," it may be determined that the news widget provides more relevant results than the image widget and may thus be initially displayed in a maximized states and the image widget may be minimized. In addition to utilizing the actually user query, classes of queries may be utilized to determine one or more given widgets to display.

When the widgets are displayed on the search result page, a given widget must fetch data for display when opened. According to one embodiment, if a given widget is closed, no data fetched for the widget. When a widget is opened, an asynchronous request may be sent to a data server 102 for content. This asynchronous request allows the widget to update itself without refreshing the entire page, thus increasing the speed at which the given client device 1012, 1014 and 1016 load the overall search results page. Although illustrated as separate from the content server 103, other embodiments may exist wherein a data server, or multiple data servers, may be present within the content server 103.

Figure 2:
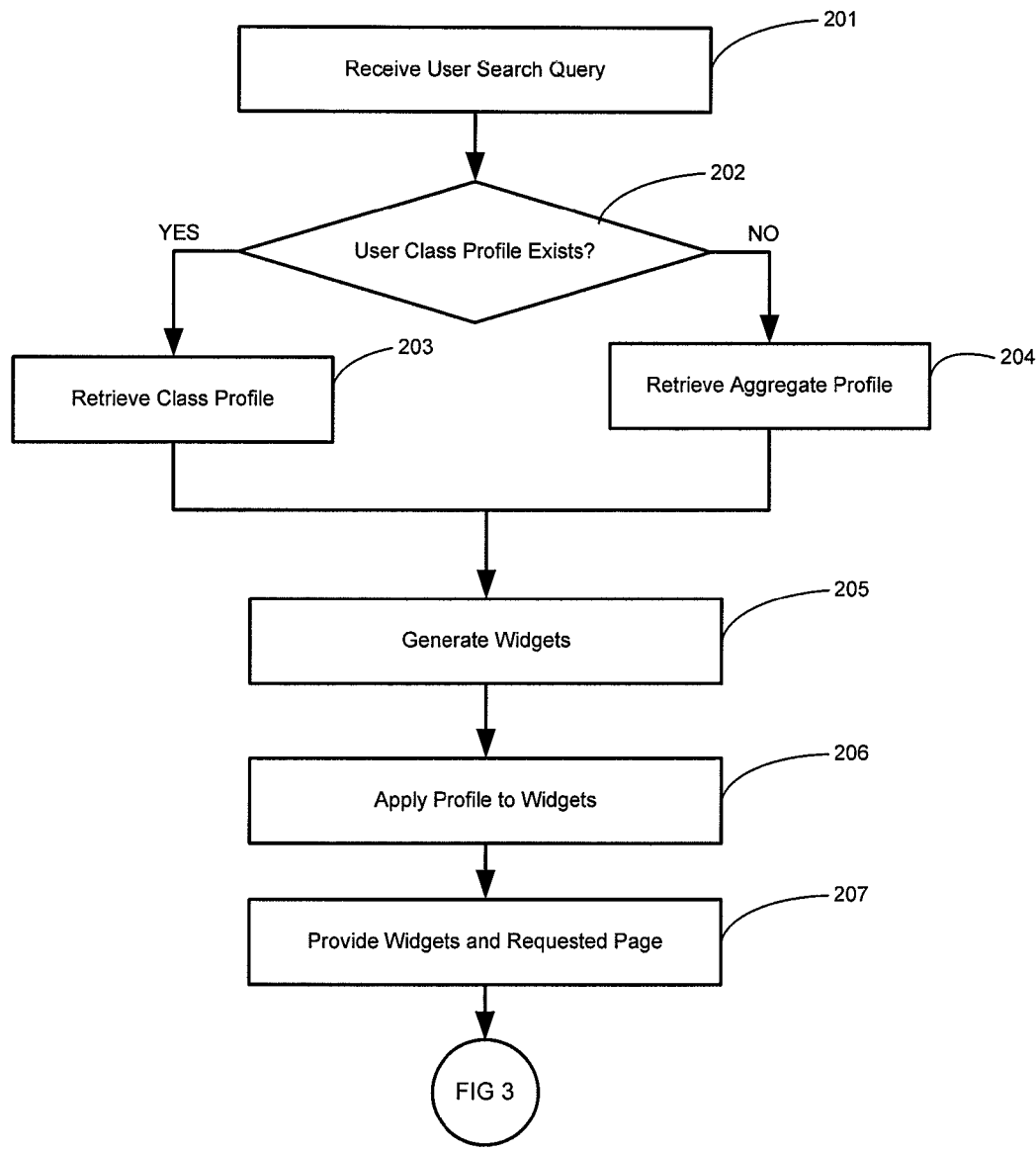
FIG. 2 is a flow diagram illustrating a method for providing search results and widgets in response to a user query according to one embodiment of the present invention.

FIG. 2 presents a flow diagram illustrating one embodiment of a method for providing search results and widgets in response to a user query. According to the embodiment FIG. 2 illustrates, a user search query is received, step 201. As previously described, a user search query may be received via an HTML form element such as a text box and sent via HTTP.

After receiving a user search query, step 201, a check is performed to determine if a user class profile exists, step 202. Many search engines allow for a user to be "logged in", that is, storing identification information that allows the search engine to identify the user entering a query. In one embodiment, class profiles may be generated that correspond to groups of users. For example, users may be grouped by supplied interests or locations provided by the users to the search engine. An exemplary user may specify his or her occupation as a broker and his or her location as New York City. This user may be classified accordingly as a user who may prefer a news widget over an image widget, as is described in greater detail below. Embodiments of the present invention may utilize cookies to collect information regarding the surfing habits and other online activity of the user for inclusion in a profile, which may be for an individual user or, in aggregate, for one or more classes of users.

If a user class profile exists, it is retrieved (step 203); if not, an aggregate profile is retrieved, step 204. In accordance with one embodiment, an aggregate profile may comprise the recorded interactions for all users, e.g., a global profile. Although classes based on user-supplied information are described, alternative embodiments of the present invention may utilize groupings such as classifying users dynamically by extracting information from the request itself, such as an IP address of a user or information stored within an HTTP header. Those of skill in the art recognize that embodiments of the invention may also utilize an individual profile for a given individual user.

After a profile is retrieved from steps 203 or 204, widgets are generated corresponding to specific content that is provided on the requested page, step 205. The widgets generated in step 205 may be generated according to a predetermined schema. In one embodiment, a plurality of widgets may be generated that are associated with a plurality of predetermined data servers. For example, a server may be configured to provide widgets for an image server, a news server, a blog server and an answer server (such as Yahoo! Answers). Widgets operative to retrieve search results from these servers may be generated in step 205. As previously mentioned, in accordance with one embodiment the widgets generated in step 205 contain only structural components such as HTML elements and do not contain content such as search result data.

After the widgets are generated in step 205, the profile retrieved in steps 203 or 204 may be applied to the widgets. According to one embodiment, the profile information is utilized to determine what characteristics or states the widgets exhibit on an initial page view. For example, a retrieved profile may illustrate that an image widget is substantially less popular than a news widget, thus a profile may be applied that causes the news widget to be minimized (such as via a tab instead of an open window) upon the page load and the image widget to be expanded (e.g., viewable) upon the page load.

The requested page and widgets are presented to the requesting user, step 207. The final page presented to the user may comprise a combination of requested search results from a first server and a plurality of widgets placed upon the same page. For example, a page may contain a first set of widgets located within a first frame, a second frame containing more widgets located with the first frame and a third frame containing the search results appearing as well.

Figure 3:
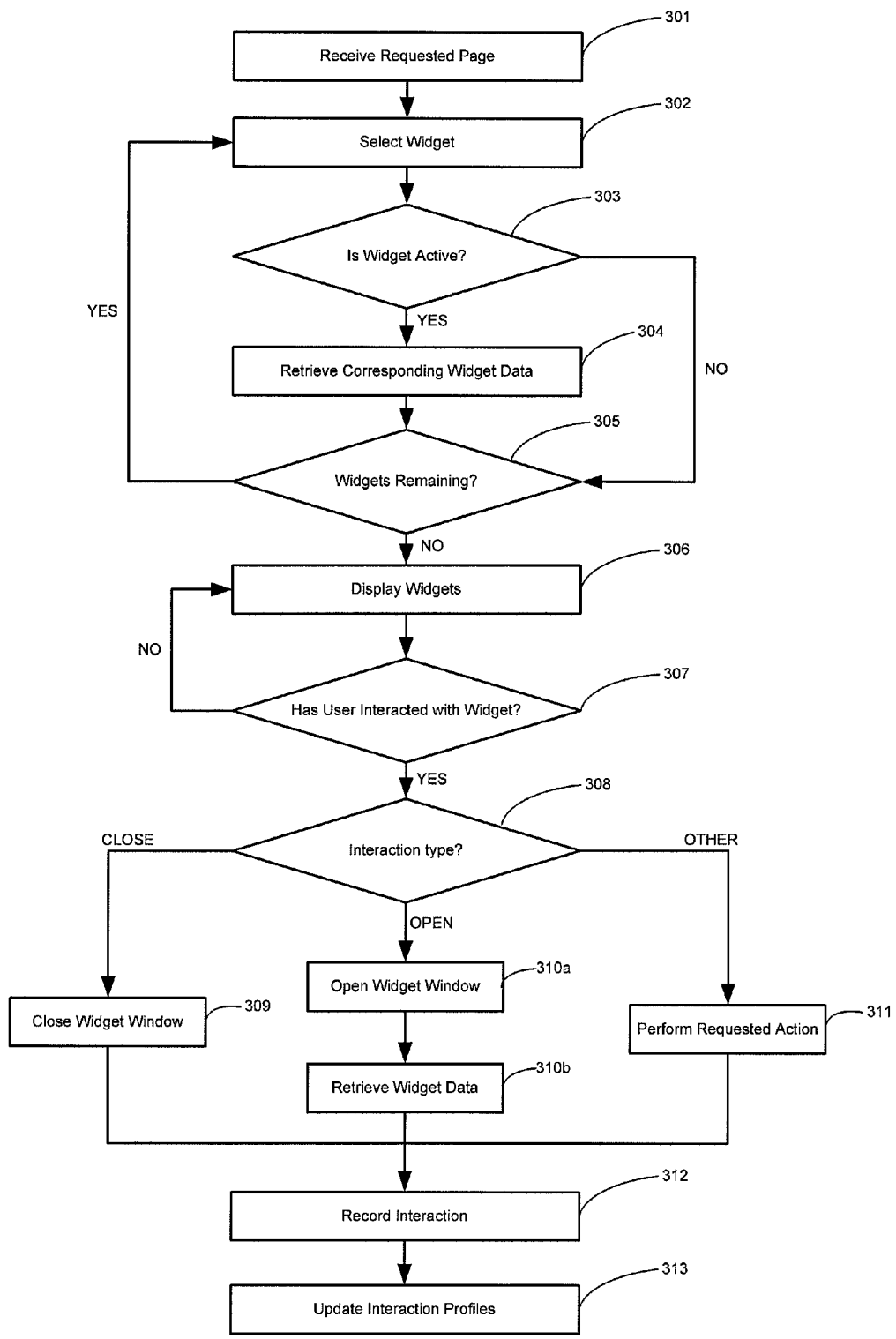
FIG. 3 is a flow diagram illustrating a method for the display of widgets on a search result page and monitoring user interaction regarding the same according to one embodiment of the present invention.

FIG. 3 presents a flow diagram illustrating one embodiment of displaying widgets on a search result page and monitoring user interaction with the widgets. According to the embodiment illustrated in FIG. 3, a requested search result page is received by a client device, step 301.

Upon receiving the page, a given widget is inspected to determine whether the given widget is in an active state (e.g., maximized). In accordance with one embodiment, the widgets may be inspected using JavaScript methods, as is known to those of skill in the art. A widget is first selected for inspection, step 302. Widgets may be selected via a function which iterates through all widgets on page load, inspecting whether they are active or inactive. If the widget is determined to be active (e.g., it is available to receive content, step 303), the corresponding content is retrieved, step 304. The content may be retrieved using an asynchronous JavaScript method that enables content to be retrieved "behind-the-scenes" while the requested page remains otherwise unchanged. Alternative embodiments may exist to retrieve widget data, such as Flash or other techniques for the transmission of content known to those of skill in the art. The widget data is retrieved and a determination is made as to whether any more widgets require inspection, step 305. If more widgets remain to be inspected, the process restarts for the remaining widgets, step 302. If no additional widgets require inspection, the widgets are displayed to the user, step 306.

The process remains at step 306 until the user interacts with one of the widgets, step 307. If a user has interacted with a widget, a determination is made as to what type of interaction was made, step 308. Various interactions may be made available to the user such as, opening a widget, closing a widget, rating the relevance of a widget or selecting a hyperlink that the widget displays.

If a user closes a widget, the widget window is subsequently closed, step 309. This closure may be in the form of minimizing, shading or actually removing the widget from the page. In one embodiment, a given actions may be associated with a degree of irrelevance, that is, actually closing a widget may be deemed to illustrate more of a distaste for the widget than minimizing or shading a widget.

A user may also open a widget, step 310a. The opening of a widget may be in the form of actually opening a new widget, maximizing a minimized widget or refreshing the currently opened widget. As in the closure of a widget, each action may be weighted accordingly, such as weighting the opening of a new widget higher than that of refreshing a currently opened widget. When a new widget is opened, new content must be retrieved, step 310*b*. In the case of opening or maximizing a widget, the widget is initially empty and thus the widget must retrieve new data. In the case of refreshing a widget, data may already be present and a user may be interacting directly with the widget to refresh the contents of the widget, thus a new, different request may be sent to refresh the widget.

A variety of other actions may also be performed by the user on the widget, step 311. For example, a widget may be equipped with a slider bar, star rating or similar mechanism that allows a user to rate a given widget. Another example may be the selection of a provided hyperlink within a widget. That is, a user interaction of selecting a relevant search result may be monitored by the widget. Another example may be monitoring the amount of time a user views the widget. This may be accomplished by monitoring the amount of time the user hovers the mouse of the widget, how long the user spends scrolling the widget window, if available, or any other means known in the art to monitor the amount of time a user spends viewing a given object.

The user performs an action and the interaction may be reported, e.g., to a content provider, step 312. In the case of opening or closing a widget, an indication that the user has activated or deactivate a given widget may be sent along with the type of opening and closing performed, as described above. Furthermore, other interactions such as a rating slider or selection of a hyperlink may be submitted to judge the relevancy of the provided results. When monitoring the amount of time a user interacts with the widget, certain embodiments contemplate that only a final interaction result may be supplied at the end of the interaction period. For example, a timer may be started when a user hovers his or her mouse over the widget and may continue until the mouse pointer is determined to be outside of the widget. An indication of how long the mouse pointer remained on the widget may be recorded in step 312. After the interactions of the user are recorded, interaction profiles are updated for use in the event subsequent page views by the user, step 313. As described previously, interaction profiles may store the interactions of a user and allow that state of a given widget to be adjusted for a particular user.

Although the steps in FIG. 3 are illustrated in sequential order, it is important to note that it may be possible or advantageous, to perform steps in parallel. For example, the update of interaction profiles (313) is illustrated as being performed after retrieving new widget data (310*b*). These two steps, however, may be performed simultaneously if desired using a technique such as an asynchronous request in JavaScript or Flash as is known to those of skill in the art. Another example may be performing the method of steps 302, 303, 304 and 305 in parallel to increase the speed at which one or more widgets load.

FIGS. 1 through 3 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method for providing dynamic search result widgets based upon historical user interaction, the method comprising:
- receiving a search query from a client requesting a search results page, wherein the search query comprises a one or more terms or phrases entered by a user into a search engine webpage;
- generating one or more widgets for providing search result content that is responsive to the search query;
- applying a display profile to the one or more widgets by accessing an interaction log that includes prior user interaction with the one or more widgets;
- identifying a plurality of search results that are responsive to the search query and generating a search results page containing the identified search results;
- embedding the one or more widgets, having the display profile applied thereon, within the generated search results page, wherein embedding the one or more widgets within the generated search results page comprises placing the widget within a pre-defined location on the generated search results page;
- providing said search result page with embedded widgets to said client; and
- monitoring user interaction with the one or more embedded widgets, wherein monitoring user interaction comprises detecting user interaction with the one or more widgets and recording the user interaction.

2. The method of claim 1, wherein the one or more widgets comprise a plurality of HTML elements.

3. The method of claim 1, wherein the one or more widgets comprise a plurality of control elements.

4. The method of claim 3, wherein said control elements comprise open, close, maximize or minimize elements.

5. The method of claim 1, wherein said display profile controls whether a given widget is displayed or hidden.

6. The method of claim 1, wherein said display profile comprises aggregate statistical data regarding user interaction with the one or more widgets.

7. The method of claim 1, wherein said display profile comprises class data regarding class interaction with the one or more widgets.

8. The method of claim 1 wherein the one or more widgets are further operative to asynchronously request content after said search result page is provided.

9. The method of claim 3 further comprising recording client interaction information upon user interaction with a given widget.

10. The method of claim 9, wherein said client interaction information is stored in a profile.

11. A system for providing dynamic search result widgets based upon historical user interaction comprising:
- a plurality of client devices;
- a network coupled to said client devices;
- a plurality of data servers coupled to said network;
- a content server coupled to said network operative to receive search queries from said client devices requesting a search results page, identify a plurality of search results that are responsive to the search query, and generate a search results page containing the identified search results, wherein the search query comprises a one or more terms or phrases entered by a user into a search engine webpage, said content server comprising:
  - an interaction log comprising display profiles corresponding to one or more widgets, the interaction log including prior user interactions with the one or more widgets generated from monitoring user interaction with the one or more widgets, wherein monitoring user interaction comprises detecting user interaction with the one or more widgets and recording the user interaction;
  - a widget generator operative to generate one or more widgets for providing search result content and apply a display profile to the one or more widgets; and
  - a generator operative to embed the one or more widgets within the generated search results page, wherein embedding the one or more widgets within the generated search results page comprises placing the widget within a pre-defined location on the generated search results page.

12. The system of claim 1 wherein the one or more widgets comprise a plurality of HTML elements.

13. The system of claim 12, wherein the one or more widgets comprise the one or more of control elements.

14. The system of claim 11, wherein a given control element comprises open, close, maximize or minimize elements.

15. The system of claim 11, wherein said display profile controls whether a given widget is displayed or hidden.

16. The system of claim 11, wherein said display profile comprises aggregate statistical data regarding user interaction with the one or more widgets.

17. The system of claim 11, wherein said display profile comprises class data regarding class interaction with the one or more widgets.

18. The system of claim 11 wherein the one or more widgets are operative to asynchronously request content after said search result page is provided.

19. The system of claim 13 wherein the one or more widgets are operative to record client interaction information upon user interaction with a given control element.

20. The system of claim 19, wherein said client interaction information is stored in said display profile.

* * * * *